United States Patent [19]

Wolf

[11] 4,033,907

[45] July 5, 1977

[54] RECLAIMING WASTE PLASTICS

[75] Inventor: William D. Wolf, Simsbury, Conn.

[73] Assignee: Monsanto Company, St. Louis, Mo.

[22] Filed: July 7, 1975

[21] Appl. No.: 593,604

[52] U.S. Cl. .............................. 260/2.3; 260/75 T; 528/489; 528/503
[51] Int. Cl.$^2$ ........................................ C08J 11/04
[58] Field of Search ....................... 260/2.3; 264/37

[56] References Cited

UNITED STATES PATENTS

| | | | |
|---|---|---|---|
| 3,344,212 | 9/1967 | Francis | 260/2.3 X |
| 3,607,999 | 9/1971 | Corbett et al. | 264/37 X |
| 3,652,466 | 3/1972 | Hittel et al. | 260/2.3 |
| 3,804,811 | 4/1974 | Rose et al. | 260/2.3 X |
| 3,852,046 | 12/1974 | Brown | 44/1 R |

OTHER PUBLICATIONS

Sweeting, The Science and Technology of Polymer Films, Interscience Publishers, N.Y., (1968), pp. 232, 233, 243, 247, 248, & 249.

Holman et al., Bureau of Mines Technical Progress Report, "Processing the Plastics from Urban Refuse," Feb. 1972.

Holman et al., Bureau of Mines Report of Investigations, 1974, "Recycling of Plastics from Urban and Industrial Refuse," (1974).

Primary Examiner—Howard E. Schain
Assistant Examiner—W. C. Danison, Jr.
Attorney, Agent, or Firm—Michael J. Murphy

[57] ABSTRACT

In reclaiming thermoplastic materials, process improvements wherein ground particles having molecular orientation are heated sufficiently to relieve orientation stresses and reduce surface area, thereby facilitating subsequent washing, separating and melt processing steps. When refabrication into other articles is intended, the materials can be exposed to a hot caustic solution to eliminate bacteria and mold growth.

9 Claims, 5 Drawing Figures

RECLAIMING WASTE PLASTICS

CROSS REFERENCE TO RELATED APPLICATION

U.S. Ser. No. 593,545, filed July 7, 1975 entitled "Improvements In Reclaiming Waste Plastics" by Eugene P. Baldyga

BACKGROUND OF THE INVENTION

This invention relates to reclaiming plastics and particularly to process improvements applicable to such reclamation.

As set forth, for example, in United States Bureau Of Mines Report of Investigations 7955, entitled "Recycling Of Plastics From Urban And Industrial Refuse", 1974, it is known to reclaim waste plastics for refabrication into similar or different products or for pyrolysis to recover monomers used in forming thermoplastic materials, or for incineration where the plastics serve as a high energy fuel source.

Rigid or semi-rigid (i.e. self-supporting) molecularly oriented thermoplastic articles such as sheet, containers in the form of trays, bottles, cups and the like, have been increasingly appearing in the marketplace and represent candidates for reclamation. Such orientation is employed to eliminate brittleness and to improve strength, thereby facilitating in this latter respect, a reduction in plastic without a corresponding loss in strength properties. Generally, such orientation involves stretching the thermoplastic material while within a pre-selected temperature range in plural (usually two) directions during fabrication in order to orderly align the molecules in the direction of stretch, followed by quenching while under stress to lock in the orientation. One category of molecularly oriented articles having major, though not exclusive, application in food and beverage packaging are containers formed of high barrier thermoplastic materials, i.e. those having respective oxygen and carbon dioxide permeabilities of less than 20 and 30 cc./day/100 sq. in./mil./atm. at 73° F., and it is especially desirable to recover such materials in view of the rather substantial cost to synthesize them.

In general, reclaiming usually involves grinding to reduce bulk, segregating the various types of materials from each other before or after such grinding, optionally followed by washing prior to either recycling for refabrication, or pyrolyzing for monomer recovery, or incinerating for energy recovery. However, it has been found that when molecularly oriented materials are ground with conventional size reduction equipment, the bulk of the particles assume a flake or plateletlike shape, wherein the particle thickness is generally significantly less than its width and breadth. In the portions of the article having substantial molecular orientation, the shear developed during grinding also tends to separate the material into layers, which layers, on being reduced in size, assume the form of such platelets. When the platelets are washed, or sorted in the reclaim process by sink-flotation gravity methods using solutions of different specific gravity, significant quantities of such liquids have been found to carry over with the platelet-shaped particles because of capillary action. Such carry-over can result in expensive losses and in substantial deliquifying and drying loads, the latter dictating an increase in size of various deliquifying components in the process train over that necessary for non-molecularly oriented materials. When the plastic being recovered is to be refabricated into new articles, as opposed to being pyrolyzed or incinerated, these platelets tend to create feeding problems to a screw masticating element in a melt processing step.

As set forth in the above-referenced commonly assigned application, the desireability of shrinking-back molecularly oriented articles to reduce bulk and assist in delabeling in a reclaim environment has been practiced in the prior art by the assignee of this application. However, if the oriented thermoplastic material is initially shrunk back to an unoriented state while in its fabricated condition, much fine material is generated thereafter in the grinding step because of the friable nature of the material, which fines can be difficult to process because of the minute dust-like consistency of the particles.

SUMMARY OF THE INVENTION

Now, however, further process improvements for overcoming the above-mentioned problems have been developed in reclaiming thermoplastic materials and particularly molecularly oriented materials.

Accordingly, it is a principal object of this invention to provide process improvements in reclaiming thermoplastic materials and particularly ground molecularly oriented materials.

Another object is to provide such improvements which minimize the carry over of liquid media with the particles during a washing or separating step.

An additional object is to provide process improvements in recycling thermoplastic materials intended for melt processing during refabrication into new articles.

A further object is to provide a convenient way to sterilize ground resin intended to be recycled, particularly for refabrication into containers requiring food grade quality resin.

Other objects will in part be obvious and will in part appear hereinafter from the following description and claims.

These and other objects are accomplished in a process for reclaiming thermoplastic materials which includes the step of reducing the material to particulate form by providing the improvement wherein the material is molecularly oriented and comprising, in combination, the step of heating the molecularly oriented particles sufficiently to relieve internal stresses whereby the surface area thereof is decreased.

As a feature, in a process for recycling thermoplastic containers which includes the step of grinding the containers and then washing and drying the ground material, there is provided the improvement comprising, in combination, the step, occurring before drying, of contacting the ground material with a caustic solution at a temperature of from about 130° to 200° F.

BRIEF DESCRIPTION OF THE DRAWINGS

In describing the overall invention, reference will be made to the accompanying drawings wherein.

DETAILED DESCRIPTION OF THE ILLUSTRATED EMBODIMENT

Figure 1:
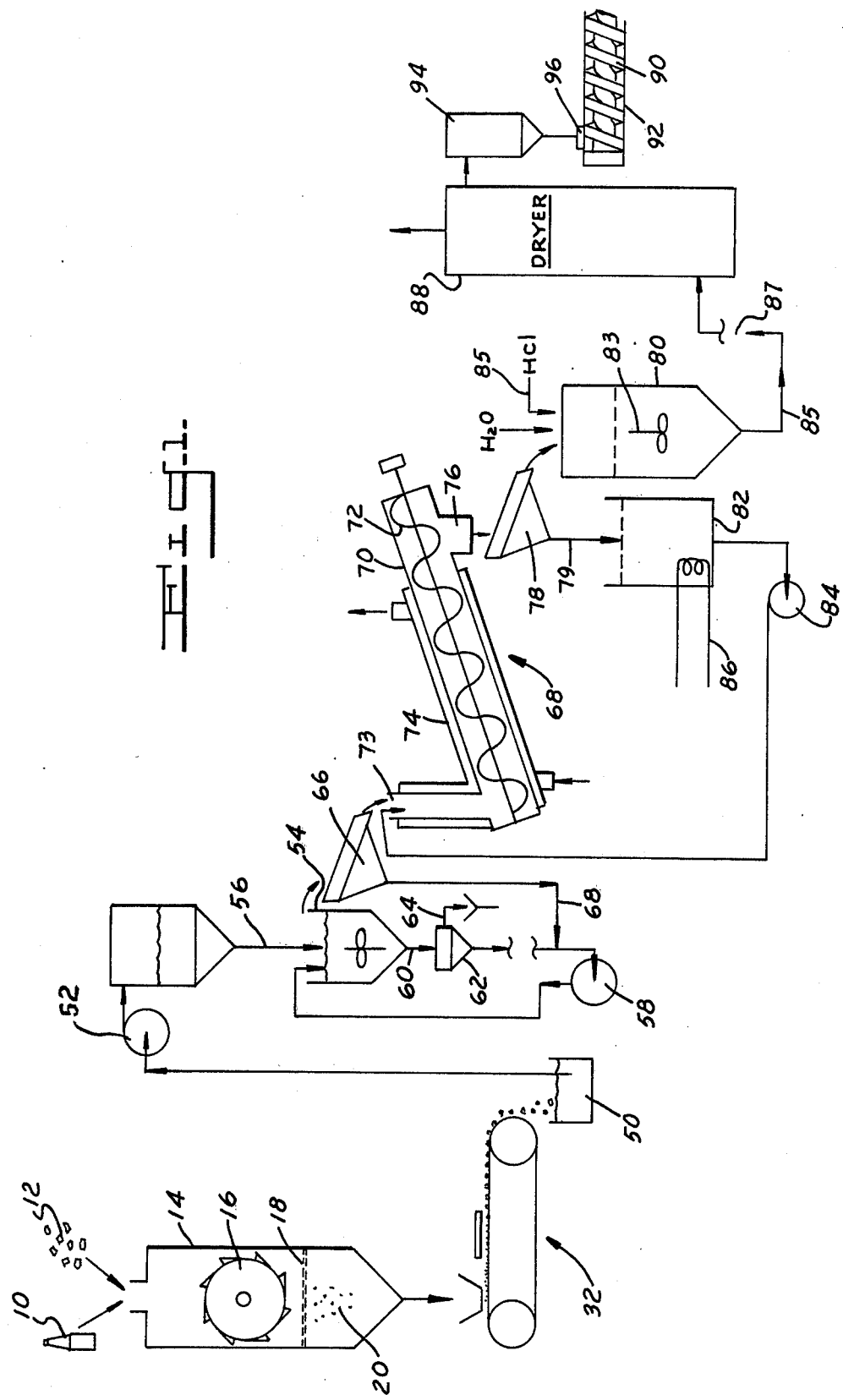
FIG. 1 is a partial, schematic flow diagram of a recycle process embodying steps of the invention.
Figure 5:
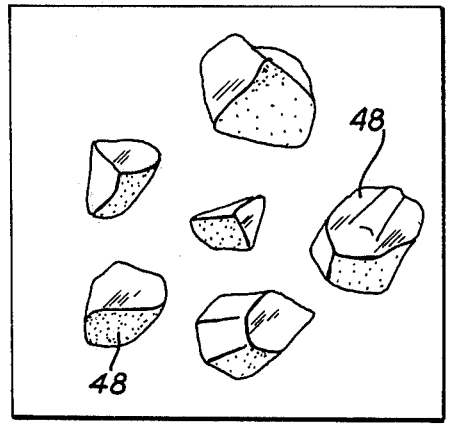
FIG. 5 is a view similar to FIGS. 3 and 4 of ground, non-molecularly oriented thermoplastic material.

Referring now to the drawings, process steps are depicted in FIG. 1 for recycling thermoplastic material. Whole, semi-rigid containers made of thermoplastic material, such as bottles 10, or the product of a previous bottle shredding step comprising particles 12, each of which has molecular orientation, are fed to a conventional, commercially available grinder 14 equipped with a rotor 16 above a screen 18 through which the ground material 20 passes after being reduced in size sufficiently to be forced through the holes therein. The product stream from grinder 14, the majority of which is molecularly oriented, is substantially at ambient temperature and is in the form of platelets 22 (FIG. 3) of varying size but wherein the thickness 24 is substantially less than the width 26 and breadth 28 dimensions thereof. It should be realized that portions of the initial article 10, may not be molecularly oriented at all or else only slightly so in comparison with other areas. For example, orientation in the heel area at the confluence of the lower sidewall of bottle 10 with its base may be substantial, (for example on the order of 100 to 800 p.s.i. orientation release stress), whereas that extent in the neck area adjacent the opening at the opposite end, or in the center of the base, may be minimal. The product exiting grinder 14, therefore, need not be completely in the form of platelets 22, but rather may include a certain proportion of rigid, ground, non-oriented material such as particles 48 (FIG. 5). If containers 10 were initially provided with labels, a portion may still be attached to platelets 22 at the exit of grinder 14, either loosely as at 30 or relatively securely depending on the type of adhesive material initially used to secure the label material to the container.

Figure 2:
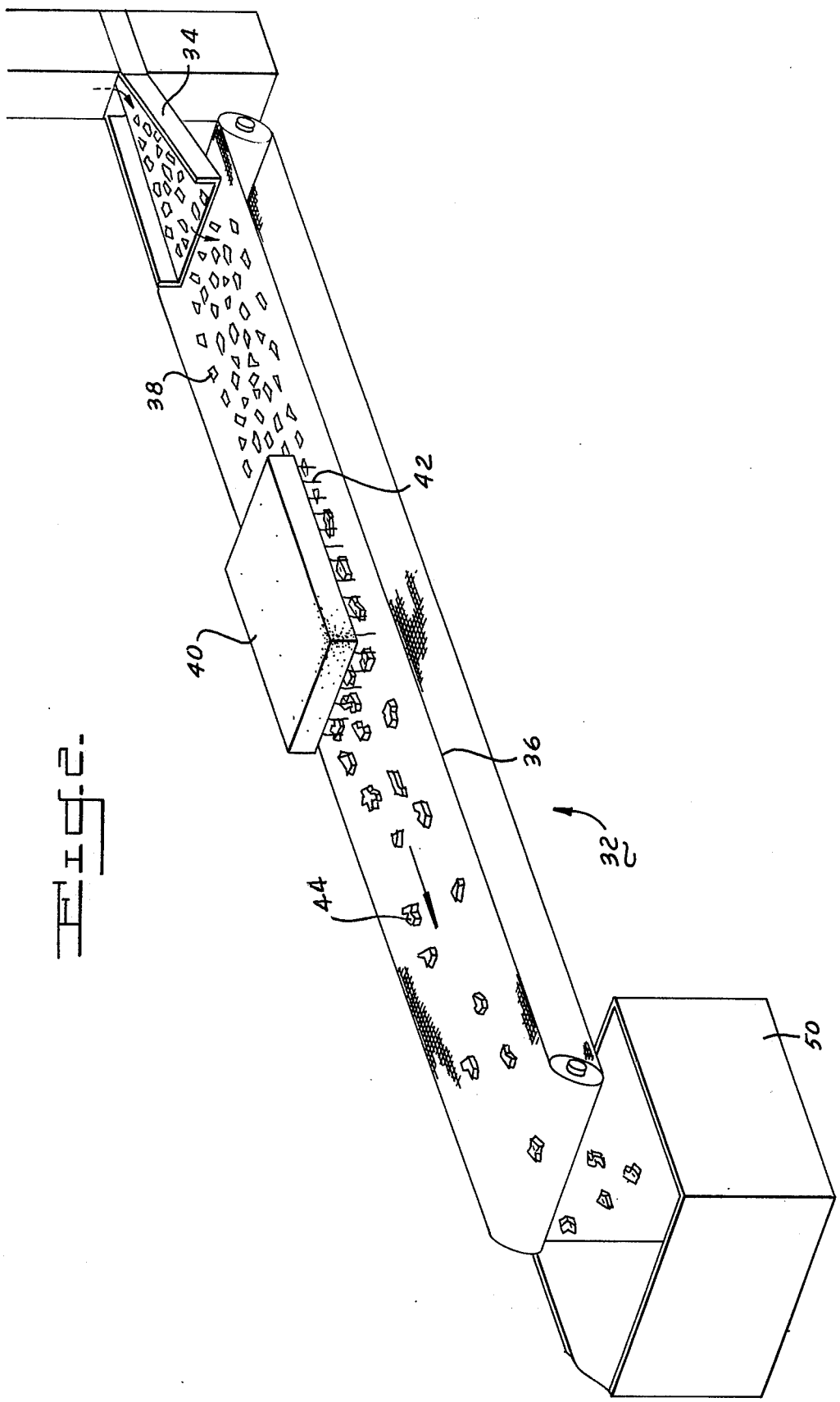
FIG. 2 is a schematic view in enlarged form of one of the steps of FIG. 1.

The ground, preferably non-cellular, platelet-shaped material 22 is deposited via a suitable feeding mechanism such as a vibratory feeder 34 (FIG. 2), on surface 36 of moving, endless belt conveyor 32 in a relatively even layer or blanket 38 at the feed end on the right side in FIG. 2. Platelets 22 are advanced forwardly on moving surface 36 and pass beneath infrared panel 40 emitting downwardly directed radiant heat waves 42. Exposure to such waves increases the platelet temperature to that sufficient to release orientation stresses therein, whereby the platelet surface area is appreciably decreased thereby reducing the area available for wetting during exposure to liquid washing or sorting media, in a manner to be shortly described.

Orientation temperatures for thermoplastic materials are those at which the polymers on stretching exhibit strength. For crystalline polymers, the molecular orientation temperature (and therefore substantially the minimum temperature necessary to relieve the stresses in the step of FIG. 2) is generally in the range of about 1° to 50° F. below the crystalline melting point of the polymer, whereas for amorphous polymers such range is about 40°–240° F. below the homogeneous melting point thereof. The temperatures to which platelets 22 are elevated may exceed the molecular orientation temperature range just noted, the time to achieve stress-relieving being accordingly reduced as temperature is increased, but such temperature should not be so high as to result in substantial fusion of adjacent particles to each other, since this will render the mix unsuitable for the subsequent steps in the process, or else require an additional regrinding step to again separate the particles.

Though a specific approach for increasing the temperature of the material to the required level is depicted in FIG. 2 and is preferred in view of simplicity, any alternative heating method and apparatus arrangement adequate to develop the required temperature level may be used.

Figure 4:
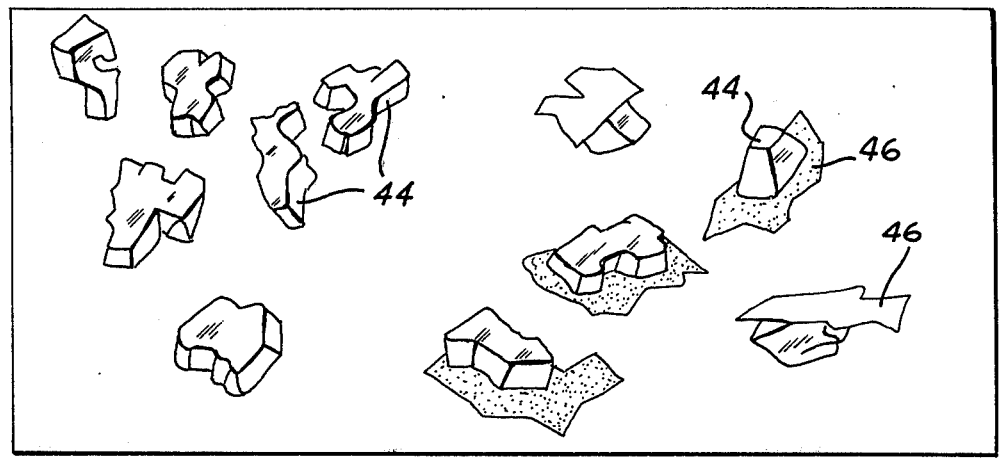

The stress-relieved, shrunk-back particles issuing from beneath panel 40 are depicted at 44 in FIG. 4. As can be seen from a comparison with FIG. 2, the platelet shape has been altered and the particles appear considerably more reduced in surface area, irregular and coarser in form. Stress relieving during the heating step can sometimes result in complete removal of shreds of label material 46 from the plastic, and, in other cases, can result in substantial but not complete separation of material 46 therefrom. When not completely separated in the heating step, removal of relatively easily accomplished in a subsequent separating step, such as by air or liquid classifying. Alternatively, the label material can be removed from bottle 10 prior to the aforementioned grinding step.

The linear rate of advancement and the length of conveyor 32 are such as to retain the shrunk-back particles 44 thereon for a brief cooling period to reduce the temperature sufficiently to minimize fusion of adjacent particles to each other. Though some light "lacing" of the shrunk-back material can occur, this is readily and substantially eliminated as a result of friction and impacting of the material during subsequent bulk handling.

Figure 3:
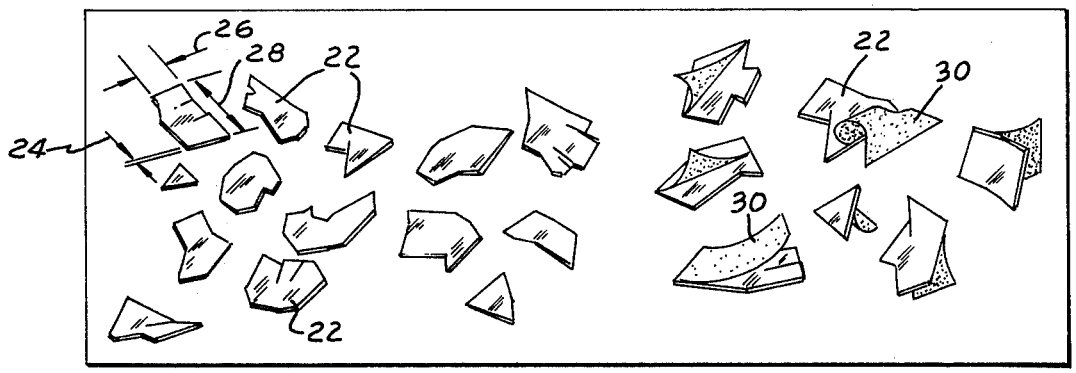
FIGS. 3 and 4 are three-dimensional views of particles of thermoplastic material before and after the step of FIG. 2.

For comparison purposes, particles 48 of FIG. 5 are substantially larger than the shrunk-back material of FIG. 4 and represent non-molecularly oriented material from which fines have been removed, passed through the same screen in grinder 14 as platelets 22 in FIG. 3.

On issuing from the exit end of conveyor 32, particles 44 are collected in a suitable receptacle 50 and conveyed, for example via a suitable blower 52, to downstream components of the reclaim train, wherein the material will be exposed to one or more liquid separating or washing media. Such a washing or liquid sorting step occurs in floatation tank 54 wherein shrunk-back particles 44 from the heating step of FIG. 2 are fed via line 56 into the open upper end of such tank together with a suitable liquid separating medium continuously circulating through such tank via pump 58. Any liquid separating medium can be used and will vary with the characteristics of the plastic being recovered. For example, a 22 wt. % aqueous solution of sodium chloride has been successfully employed. The function of the tank and liquid medium is to separate heavy solid contaminants having a specific gravity greater than the resin, e.g. portions of container closures, dirt, glass, extraneous waste material and the like left in the container after various uses, through drain line 60, while lighter materials, preferably comprising the particles being recovered, and which have a specific gravity less than that of the separating medium, overflow tank 54 to screen 62 together with the medium. Screen 62 below tank 54 separates the heavy contaminants (stream 64) which are dumped to a suitable refuse area, from a portion of the liquid separating medium returned to a recirculating tank, not shown, feeding recirculating pump 58. Introduction of the plastic particles to tank 54 is preferably in a downward direction into a vortex created by agitation, in order to provide a downward velocity to the heavier particles to assist in separating while requiring the light fraction to reverse direction and float to the liquid surface. The shrunk-back, light, particles overflow by gravity with the separating medium stream 68 out a weir near the top of the tank to vibratory separating screen 66 through which the separating medium passes back to the recirculation tank. When recycle of the resin material for refabrication into other articles is not intended, the resin solids discharge from screen 66, either wholly or partially, may be directed to a suitable means, not shown, for pyrolizing or incinerating the resin directly. For that matter, the shrunk-back discharge from conveyor 32 could also be fed to such means after a rough, dry screening operation to remove gross contaminants.

If the resin product from screen 66 is to be refabricated into other articles such as containers, it is preferably fed to digester 68 wherein the previously ground particles are intimately contacted with a hot caustic solution at a temperature of from about 130° to 200° F. for a predetermined time period. This hot caustic wash, which may be used without the shrink-back step of FIG. 2, i.e. either with molecularly oriented or non-molecularly oriented materials, destroys mold growth and bacteria, which could result in a failure of the recycled material to meet Public Health standards, and dissolves metallic contaminants, such as aluminum caps and label foil, which might be carried over from the liquid sorting step with the polymer. Digester 68 consists of an inclined hollow cylindrical vessel 70 jacketed at 74 throughout the greater part of its length and equipped with a rotatable screw conveyor 72, the shaft of which is coaxial with the longitudinal axis of vessel 70. A suitable temperature-conditioning medium, for example hot water, is continuously circulated through jacket 74 to maintain the required temperature within vessel 70. The solid resin material enters inlet end 73, descends by gravity to the lower end of vessel 70, and is gradually conveyed upwardly by the flights of conveyor 72 whereupon it falls by gravity through exit end 76 to inclined vibrating screen 78. The hot caustic solution drains through screen or strainer 78 and flows at 79 by gravity to hold tank 82 from where it is continuously recirculated via pump 84 to digester inlet 73 for repeated passes. Coil 86 in tank 82 may also be conventionally associated with a suitable temperature-controlled medium to maintain the temperature of the solution in tank 82 at a preset level. The caustic solution used with digester 68, as well as the brine solution used with tank 54, are replaced and fortified as necessary to maintain the desired strength levels.

Solids issuing from screen 78 fall from the screen surface by gravity preferably into washing and neutralizing tank 80 having an agitator 83. The function of batch tank 80 is to neutralize the alkaline resin which has just been washed with caustic, via intimate mixing with water and optionally with a small charge of an acidic medium such as hydrochloric acid—i.e. stream 85. For example, it may be unnecessary to employ the latter if the resin is sufficiently washed with potable water in tank 80. After a predetermined time interval, when the ph of the tank contents has reached the desired level, which is preferably slightly on the basic side, the resin-liquid slurry is drained through line 85 to a suitable dewatering assembly such as centrifuge not shown not located at 87, where the major portion, e.g. over about 80%, of the water is removed from the resin.

The dewatered material is then fed to a dryer, depicted schematically in FIG. 1 at 88, which may be of conventional design, for example a rotating cylindrical chamber equipped with steam-heated coils wherein additional water is evaporated to dry the resin to the level required for subsequent refabrication. Ground, sterilized, recycled, shrunk-back particles in the form depicted on the left side in FIG. 4, and devoid of any attached extraneous contaminants, may be fed from hopper 94 through nozzle 96 to extruder 92 for conventional conversion to melt form via rotating screw 90, as the initial phase in refabricating other articles therefrom. Any microbes which could contribute color or specks to the extrudate or generate odor and/or gas in storage are eliminated by the aforementioned hot caustic exposure of the resin. Because of the substantial, irregular, non-platelet shape of the particles, the material feeds well to extruder 92 and results in a significant increase in throughput over that attainable with the platelet shapes of FIG. 3 under equivalent extrusion operating conditions. Combining certain proportions of recycled and virgin resin upstream of extruder 92 to provide a mixed feed is contemplated, as desired.

Any thermoplastic material, e.g. layered or single thickness, cellular or non-cellular, may be used with the stress-relieving heating step of the present invention if it has been molecularly oriented to the extent that a reduction in surface area of at least about 5% occurs on heating, for example to about the glass transition temperature range of the material. Materials particularly suitable are high barrier polymers, as previously defined, such as those wherein a major proportion (at least 55 wt.%) is formed of a polymerized nitrile-group-containing monomer selected from the group consisting of acrylonitrile, methacrylonitrile and mixtures thereof. A particularly preferred such nitrile group-containing-monomer is acrylonitrile. Other high barrier materials particularly valuable for recovery include those based on polyethylene terephthalates wherein the polymer contains repeating ethylene terephthalate units of the formula:

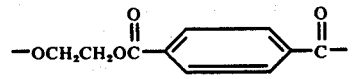

Alternatively useful thermoplastic materials include polymers and copolymers based on vinyl chloride, olefins such as ethylene and propylene, styrene and the like. Any comonomer compatible with those collectively mentioned above may be used.

EXAMPLE I

A molecularly oriented bottle formed of a thermoplastic material comprising a 70/30 weight percent polymerized acrylonitrile/styrene copolymer was shredded in a first size-reducing step and then passed through a grinder of the type illustrated in FIG. 1, using a screen with ¼ inch openings, to produce platelet-shaped particles generally as appearing at 22 in FIG. 3. A layer of such particles about ½ inch thick was subjected to a temperature of 230° F. in an oven for 5 minutes. The original particle size was roughly 3/16 inch by ¼ inch square varying in thickness from about 0.005 inch to 0.050 inch. When removed from the oven, the shrunk-back layer had reduced in thickness to about 5/16 inch to 3/8 inch and the particles appeared to be granular and more uniform having face dimensions ranging between about 1/16 inch to ⅛ inch.

Two Ehrlemeyer flasks were weighed and 50 gms of the shrunk-back particles (44 in FIG. 4) added to one while 50 gms of the platelet material (22 in FIG. 3) were added to the other; 200 gms of water were added to each of the weighed samples which were then shaken well to wet all the particles. The platelet sample was basically observed to be a mush whereas a free volume of water was observed in the shrunk-back sample. A Buchner funnel and aspirator were set up with a wetted filter paper in place therein. The funnel and wet filter paper were weighed and then each individual sample was added to the funnel from the flasks which were washed out well with distilled water to remove all polymer particles. The aspirator was allowed to function with each sample for about 15–20 sec. after all the water was down. The funnel and sample were then weighed and the weight of water retained with the particles in each case calculated as follows:

| | |
|---|---|
| Funnel + paper + shrunk-back sample | = 374 gms. |
| Funnel + paper | = 312 gms. |
| Wet wt. of polymer | 62 gms. |
| Dry sample wt. | 50 gms. |
| Wt. retained water | 12 gms. |
| % $H_2O$ $\frac{100 \times 12}{50} = 24\%$ | |
| Funnel + paper + platelet sample | = 404 gms. |
| Funnel + paper | = 313 gms. |
| Wet wt. of polymer | 91 gms. |
| Dry sample wt. | 50 gms. |
| Wt. retained water | 41 gms. |
| % $H_2O$ $\frac{100 \times 41}{50} = 82\%$ | |

The above shows the difference in wetting or moisture retention considered to be due to the shape effect of the particles — i.e. the capillary effect between the platelets vs. the reduced retention by the coarser denser, more spherical, stress-relieved particles.

To illustrate the shape factor of platelets vs. shrunk-back particles as it relates to wetting surface, the following calculations were made: Assumptions: A realistic shape of platelet particles is ¼ inch × ¼ inch × 0.050 inch; that for shrunk-back particles is essentially spherical. Thus platelet shape, volume and area are $V = 0.25 \times 0.25 \times 0.050 = 0.003125$ in.$^3$
$A = 2(0.25 \times 0.25) + 4(0.25 \times 0.05) = 0.125 + 0.05 = 0.175$ in.$^2$
Ratio A:V = 56:1

For a spherical particle shape of the same volume:
$V = 0.003125$ in.$^3 = \pi d^3/6$ $$d = \sqrt[3]{\frac{.003125 \times 6}{\pi}} = \sqrt[3]{.0059683} = 0.18076 \text{ in.}$$

$A = \pi d^2 = \pi(0.18076) = 0.10263$ in.$^2$
Ratio A:V = 33:1

Area of the sphere is only 59% of the area of the platelet or, stated otherwise, has 41% less area than a platelet.

To compare the bulk density of platelet vs. shrunk-back material, a pint plastic jar weighing 49 gms was in three cases filled to overflow and the following measurements made.

| | |
|---|---|
| jar + platelet material | 226 gms. |
| jar only | 49 gms. |
| wt. platelet material | 177 gms. |
| jar + shrunk-back material | 257 gms. |
| jar only | 49 gms. |
| wt. of shrunk-back material | 208 gms. |
| Jar + water | 585 gms. |
| jar only | 49 gms. |
| wt. water | 536 gms. |

Bulk density of platelet material: $177/536 \times 62.43 = 20.6$ pound/ft$^3$
Bulk density of shrunk-back material: $208/536 \times 62.43 = 24.2$ pound/ft$^3$
Thus shrunk-back material has a higher bulk density than platelet material by 17.5%.

EXAMPLE II

Platelet material and shrunk-back material of the composition used in Example I was extruded through a conventional extruder employing a 1-¼ inch screw, a barrel temperature of 420°–460° F. and a die designed to produce a solid strand of about ⅛ inch diameter. Conventional ground, non-molecularly oriented material was used as a control. The screw was operated at 40 rpm and the temperature of the material at the feed end of the extruder was 132° F. The following results were obtained:

| Sample Description | Rate (gms extrudate per min.) | Stock Temp. (° F.) | Extruder Head Pressure(p.s.i.) |
|---|---|---|---|
| Control-(ground-non-oriented particles - 100%) | 138 | 470 | 1260–1440 |
| Platelets - 100% | 112 | 472 | 1200–1260 |
| Shrunk-back material - 100% | 133 | 470 | 1320–1440 |

From the above data it is evident that extrudability of the shrunk-back particles essentially approached that of the control sample (i.e. within about 4%) and was some 16% greater than that of the non-stress-relieved platelet material.

EXAMPLE III

To determine the effectiveness from the standpoint of elimination of bacteria and mold growth, two samples of two hundred grams each of the stress-relieved material from Example I was treated in one case with a sterile culture medium, trypticase soy broth (TSB), and in another case with the same medium innoculated with bacteria (B. subtilis). Aliquots of each were tested immediately for bacterial count (colonies/gr.) as well as after treatment under certain conditions listed below.

Following is a tabulation of bacteriological findings.

| | Bacterial Colonies/gr. of resin |
|---|---|
| Sterile TSB | 110 |
| 48 hr. B. subtilis culture inoculated, untreated | 2400 |
| Brine wash only (20 wt. % sodium chloride/water at room temperature for 2 min.) | $4 \times 10^5$ |
| Brine and 6 wt. % caustic wash, 5 min. at 150° F | $2.1 \times 10^3$ |
| | 4.1 |

-continued

| | Bacterial Colonies/gr. of resin |
|---|---|
| Brine and 6 wt. % caustic wash, 10 min. at 150° F | no growth |
| Brine and 6 wt. % caustic wash, 5 min. at 180° F | no growth |
| Brine and 6 wt. % caustic wash, 10 min. at 180° F | no growth |

Based on the above results the effectiveness of the brine and caustic wash was established at 10 min. at 150° F. or a shorter time at higher temperature to be adequate to insure a sufficiently clean food-container grade material to meet necessary Public Health standards.

The above description and particularly the drawings are set forth for purposes of illustration only and are not to be taken in a limited sense. Various modifications and alterations will be readily suggested to persons skilled in the art. It is intended therefore, that the foregoing be considered as exemplary only and that the scope of the invention be ascertained from the following claims.

What is claimed is:

1. In a process for recycling non-cellular molecularly oriented thermoplastic material which includes the steps of:
   reducing the material to the form of platelets; and
   melt processing such material via a rotating screw during refabrication of articles therefrom;
   the improvement in said process comprising, in combination, the step of:
   heating the molecularly oriented platelets to within the molecular orientation temperature range of the thermoplastic material prior to such melt processing to relieve stresses in the platelets without causing substantial fusing of adjacent platelets whereby the surface area is decreased to improve the screw feeding characteristics.

2. The process of claim 1 wherein: said platelets are exposed to infra-red radiation while being conveyed forwardly in a layer on a moving surface to accomplish said heating.

3. The process of claim 1 including the step subsequent to said heating of:
   exposing the products of said heating step to a caustic solution at a temperature of from about 130° to 200° F. for a time sufficient to sterilize same.

4. The process of claim 3 including the step of:
   neutralizing said products subsequent to exposure to said caustic solution.

5. The process of claim 4 wherein said neutralization is such that the thermoplastic material remains basic after completion thereof.

6. In a process for recycling non-cellular thermoplastic containers which includes the steps of:
   grinding the containers to reduce the bulk thereof;
   exposing the ground material to one or more liquid separating or washing media;
   drying the material; and thereafter
   melt processing said dried material via a rotating screw;
   the improvements in said process wherein said containers have molecular orientation and comprising, in combination, the step of:
   heating the molecularly oriented material after said grinding step and before said step of exposure to a liquid media to within the molecular orientation temperature range of the material to substantially relieve orientation stresses therein without causing substantial fusion of the material.

7. The process of claim 6 wherein the thermoplastic material is a high barrier polymer.

8. The process of claim 6 wherein the thermoplastic material contains a major proportion of a polymerized olefin.

9. The process of claim 7 wherein the high barrier polymer contains a major proportion of a polymerized monomer selected from the group consisting of acrylonitrile, methacrylonitrile and mixtures thereof.

* * * * *